United States Patent
Luo et al.

(10) Patent No.: US 10,866,796 B2
(45) Date of Patent: Dec. 15, 2020

(54) SOFTWARE UPGRADE METHOD AND APPARATUS, AND DEVICE

(71) Applicant: Huawei Device Co., Ltd., Shenzhen (CN)

(72) Inventors: Su Luo, Wuhan (CN); Xiaoyi Han, Shenzhen (CN); Jiewei Li, Xi'an (CN)

(73) Assignee: Huawei Device Co., Ltd., Dongguan (CN)

( * ) Notice: Subject to any disclaimer, the term of this patent is extended or adjusted under 35 U.S.C. 154(b) by 29 days.

(21) Appl. No.: 15/304,969

(22) PCT Filed: Apr. 18, 2014

(86) PCT No.: PCT/CN2014/075714
§ 371 (c)(1),
(2) Date: Oct. 18, 2016

(87) PCT Pub. No.: WO2015/158000
PCT Pub. Date: Oct. 22, 2015

(65) Prior Publication Data
US 2017/0185390 A1    Jun. 29, 2017

(51) Int. Cl.
*G06F 8/65* (2018.01)
*H04N 21/435* (2011.01)
(Continued)

(52) U.S. Cl.
CPC .............. *G06F 8/65* (2013.01); *H04N 21/235* (2013.01); *H04N 21/435* (2013.01); *H04N 21/4882* (2013.01); *H04N 21/8166* (2013.01)

(58) Field of Classification Search
CPC ............ G06F 8/65–68; G06F 8/60–66; H04N 21/235; H04N 21/435; H04N 21/4882; H04N 21/8166
See application file for complete search history.

(56) References Cited

U.S. PATENT DOCUMENTS 5,418,524 A * 5/1995 Fennell ................. G06F 9/4415
                                                        340/7.41
5,586,304 A * 12/1996 Stupek, Jr. ................ G06F 8/68
                                                        707/999.201
(Continued)

FOREIGN PATENT DOCUMENTS

CN         1487740 A      4/2004
CN       101548537 A      4/2004
(Continued)

OTHER PUBLICATIONS

International Search Report issued in International Application No. PCT/CN2014/075714, dated Jan. 28, 2015, 4 pages.
(Continued)

*Primary Examiner* — S. Sough
*Assistant Examiner* — Zheng Wei
(74) *Attorney, Agent, or Firm* — Fish & Richardson P.C.

(57) ABSTRACT

Embodiments of the present invention provide a software upgrade method and apparatus, and a device. The method is applied to a software upgrade of a digital television terminal and includes: obtaining a DSI table in an upgrade data stream according to location information of the upgrade data stream that is carried in an upgrade notification message, where the DSI table carries upgrade software description information; displaying the upgrade software description information and upgrade prompt information to a user if it is determined, according to the upgrade software description information, to upgrade local software; and after the user determines to upgrade software, obtaining an upgrade software mirror in the upgrade data stream, and updating the local software according to the upgrade software mirror.

10 Claims, 7 Drawing Sheets

(51) Int. Cl.
*H04N 21/488* (2011.01)
*H04N 21/235* (2011.01)
*H04N 21/81* (2011.01)

(56) References Cited

U.S. PATENT DOCUMENTS

| | | | | |
|---|---|---|---|---|
| 6,058,478 A * | 5/2000 | Davis | H04L 9/3247 | 713/170 |
| 6,219,698 B1 * | 4/2001 | Iannucci | G06F 8/65 | 709/203 |
| 6,230,194 B1 * | 5/2001 | Frailong | H04L 41/082 | 709/220 |
| 6,718,374 B1 * | 4/2004 | Del Sordo | G06F 8/64 | 348/E5.006 |
| 6,826,581 B2 * | 11/2004 | Moslander | G06F 8/65 | |
| 6,904,611 B1 * | 6/2005 | Poli | G06F 8/61 | 348/E5.006 |
| 6,944,856 B2 | 9/2005 | Taylor | G06F 8/60 | 717/171 |
| 6,975,612 B1 * | 12/2005 | Razavi | G01C 21/26 | 370/338 |
| 7,016,944 B1 * | 3/2006 | Meyer | G06F 8/65 | 709/218 |
| 7,055,149 B2 * | 5/2006 | Birkholz | G06F 8/65 | 705/59 |
| 7,062,765 B1 * | 6/2006 | Pitzel | G06F 8/61 | 709/201 |
| 7,069,551 B2 * | 6/2006 | Fong | G06F 9/4433 | 717/171 |
| 7,069,578 B1 * | 6/2006 | Prus | G06F 8/64 | 348/E5.006 |
| 7,080,371 B1 * | 7/2006 | Arnaiz | G06F 8/65 | 717/168 |
| 7,523,451 B2 * | 4/2009 | Kwon | G06F 8/65 | 717/173 |
| 7,774,820 B2 * | 8/2010 | Prus | G06F 8/64 | 717/168 |
| 7,840,978 B2 * | 11/2010 | Choe | H04N 5/4401 | 725/39 |
| 7,979,854 B1 * | 7/2011 | Borole | G06F 8/65 | 709/222 |
| 8,023,043 B2 * | 9/2011 | Joo | H04N 7/162 | 348/553 |
| 8,032,917 B2 * | 10/2011 | Poli | G06F 8/61 | 725/132 |
| 8,352,934 B1 * | 1/2013 | Borole | G06F 8/65 | 709/222 |
| 8,484,318 B2 * | 7/2013 | Zhang | H04L 12/1895 | 370/229 |
| 8,799,433 B2 * | 8/2014 | Koh | G06F 8/65 | 709/220 |
| 9,454,363 B1 | 9/2016 | Angell | G06F 8/65 | |
| 9,672,022 B2 * | 6/2017 | Evans | G06F 8/61 | |
| 10,346,613 B2 * | 7/2019 | Djabarov | G06F 8/654 | |
| 2003/0023963 A1 * | 1/2003 | Birkholz | G06F 8/65 | 717/172 |
| 2005/0091699 A1 * | 4/2005 | Poli | G06F 8/61 | 725/132 |
| 2005/0108701 A1 * | 5/2005 | Kwon | G06F 8/65 | 717/168 |
| 2005/0144651 A1 * | 6/2005 | Prus | G06F 8/64 | 725/134 |
| 2006/0150217 A1 * | 7/2006 | Joo | H04N 7/162 | 725/50 |
| 2006/0244986 A1 * | 11/2006 | Ferlitsch | G06F 3/1204 | 358/1.13 |
| 2006/0280443 A1 * | 12/2006 | Horii | G11B 27/034 | 386/206 |
| 2006/0285690 A1 * | 12/2006 | Jung | H04N 21/4345 | 380/237 |
| 2007/0118617 A1 * | 5/2007 | Lee | G06F 8/65 | 709/219 |
| 2007/0263716 A1 * | 11/2007 | Huang | H04N 7/165 | 375/240 |
| 2008/0077681 A1 * | 3/2008 | Koh | G06F 8/65 | 709/221 |
| 2008/0092197 A1 * | 4/2008 | Koh | G06F 8/65 | 725/132 |
| 2009/0300598 A1 * | 12/2009 | Choi | G06F 8/61 | 717/173 |
| 2010/0023935 A1 | 1/2010 | Lee et al. | | |
| 2010/0095288 A1 | 4/2010 | Kim | | |
| 2011/0093516 A1 * | 4/2011 | Geng | G06F 8/65 | 707/827 |
| 2012/0099024 A1 * | 4/2012 | Ryu | H04N 21/4586 | 348/730 |
| 2015/0100955 A1 * | 4/2015 | Chen | G06F 8/65 | 717/170 |
| 2017/0034309 A1 * | 2/2017 | Duan | G06F 8/65 | |
| 2018/0204008 A1 * | 7/2018 | Djabarov | G06F 8/654 | |

FOREIGN PATENT DOCUMENTS

| | | |
|---|---|---|
| CN | 101001316 A | 7/2007 |
| CN | 101496396 A | 7/2009 |
| CN | 101548537 A | 9/2009 |
| CN | 101827126 A | 9/2010 |
| CN | 102333240 A | 1/2012 |
| CN | 102905173 A | 1/2013 |
| CN | 103167348 A | 6/2013 |
| EP | 2056195 A1 | 5/2009 |
| JP | 2008060702 A | 3/2008 |
| JP | 2008193237 A | 8/2008 |
| JP | 2009147905 A | 7/2009 |
| JP | 2013070247 | 4/2013 |

OTHER PUBLICATIONS

Extended European Search Report issued in European Application No. 14889194.8 dated Jun. 7, 2017; 10 pages.
International Search Report in International Application No. PCT/CN2014/075714 dated Jan. 28, 2015, 12 pages.
Chinese Office Action in Chinese Applicaton No. 201480008218.X, dated Dec. 4, 2017, 20 pages.
Japanese Office Action in Japanese Application No. 2016-563087, dated Nov. 7, 2017, 9 pages.
EPO Communication under Rule 71(3) EPC issued in European Application No. 14889194.8 dated Aug. 26, 2019, 34 pages.

* cited by examiner

SOFTWARE UPGRADE METHOD AND APPARATUS, AND DEVICE

CROSS-REFERENCE TO RELATED APPLICATIONS

This application is a national stage of International Application No. PCT/CN2014/075714, filed on Apr. 18, 2014, which is hereby incorporated by reference in its entirety.

TECHNICAL FIELD

Embodiments of the present invention relate to communications technologies, and in particular, to a software upgrade method and apparatus, and a device.

BACKGROUND

With development of digital television services and technologies, software of a digital television terminal needs to be upgraded and updated, so as to resolve a defect of the digital television terminal or add a new service function.

At present, software upgrade of the digital television terminal may be mainly classified into two types: a maintenance upgrade and an online upgrade. During online upgrade, a front-end server delivers a software upgrade message and software data to perform a unified upgrade on all or some of digital television terminals. Generally, when detecting the software upgrade message, the digital television terminal reminds a user, and the user determines whether to upgrade software. Therefore, during an upgrade of a digital television terminal, the user wants to know more upgrade software description information.

Figure 1:
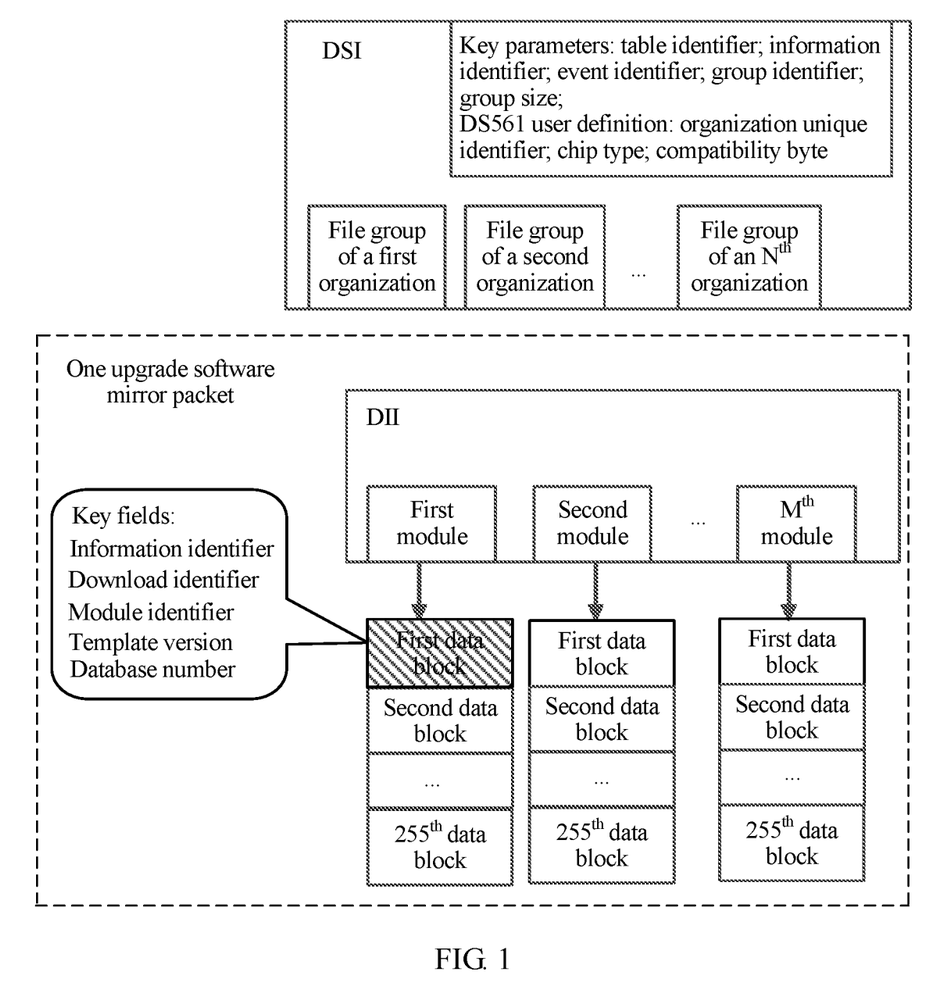
FIG. 1 is an exemplary diagram of a TS packet format in the prior art.

In the prior art, a server compiles upgrade software description information together with a program resource, and the upgrade software description information is used as an upgrade software mirror. Then, the upgrade software mirror is encapsulated into a transport stream (Transport Stream, TS for short) packet by using a digital storage media command and control (Digital Storage Media-Command and Control, DSM-CC for short), and the TS packet is delivered to the digital television terminal. After receiving all TS packets, the digital television terminal restores all the TS packets into an original upgrade software mirror, and performs an integrity check on the upgrade software mirror. If the check is passed, the digital television terminal extracts upgrade software description information from the upgrade software mirror, and displays the upgrade software description information to the user. A TS packet format in the prior art and information that is included in each part are shown in FIG. 1, and a part with oblique lines is a location of the upgrade software description information.

However, when a method for performing an online software upgrade in the prior art is used, it takes a relatively long time for the user to wait for the upgrade software description information, affecting user experience.

SUMMARY

The present invention provides a software upgrade method and apparatus, and a device, so as to quickly display upgrade software description information to a user in a digital television terminal software upgrade process.

According to a first aspect, the present invention provides a software upgrade method, where the method is applied to a software upgrade of a digital television terminal and includes:

obtaining a download server indication DSI table in an upgrade data stream according to location information of the upgrade data stream that is carried in an upgrade notification message, where the DSI table carries upgrade software description information;

displaying the upgrade software description information and upgrade prompt information to a user if it is determined, according to the upgrade software description information, to upgrade local software; and obtaining an upgrade software mirror in the upgrade data stream, and updating the local software according to the upgrade software mirror after the user determines to update software.

In a first possible implementation manner of the first aspect, the obtaining a DSI table in an upgrade data stream according to location information of the upgrade data stream that is carried in an upgrade notification message includes:

obtaining a transport stream packet in the upgrade data stream according to the location information of the upgrade data stream that is carried in the upgrade notification message; and restoring the transport stream packet, to obtain the DSI table that is included in a data segment section.

According to the first possible implementation manner of the first aspect, in a second possible implementation manner of the first aspect, the restoring the transport stream packet, to obtain the DSI table that is included in a data segment section includes:

restoring the transport stream packet, to obtain the data segment section; and finding the DSI table according to a table identifier table_id and a DSI information identifier message_id that are in the data segment section.

According to any one of the first aspect, or the first to the second possible implementation manners of the first aspect, in a third possible implementation manner of the first aspect, the displaying the upgrade software description information and upgrade prompt information to a user if it is determined, according to the upgrade software description information, to upgrade local software includes:

comparing the upgrade software description information with local machine version information to determine whether to upgrade the local software; and if it is determined to upgrade the local software, displaying the upgrade software description information and the upgrade prompt information to the user.

According to any one of the first aspect, or the first to the third possible implementation manners of the first aspect, in a fourth possible implementation manner of the first aspect, the obtaining an upgrade software mirror in the upgrade data stream, and updating the local software according to the upgrade software mirror after the user determines to upgrade software includes:

after the user determines to upgrade the software, obtaining a download information indication DII and a download data block DBB that are in the upgrade data stream;

obtaining the upgrade software mirror according to the DBB, and performing an integrity check on the upgrade software mirror; and updating the local software by using the upgrade software mirror that passes the integrity check.

According to a second aspect, the present invention provides a software upgrade method, where the method is applied to a software upgrade of a digital television terminal and includes:

adding upgrade software description information to a download server indication DSI table of a digital storage media command and control DSM-CC;

obtaining an upgrade data stream according to the DSI table and an upgrade software mirror corresponding to upgrade software; and sending an upgrade notification message to the digital television terminal, where the upgrade notification message carries location information of the upgrade data stream, so that the digital television terminal determines, according to the upgrade notification message, whether to download the upgrade data stream so as to upgrade local software.

In a first possible implementation manner of the second aspect, the adding upgrade software description information to a DSI table of a DSM-CC includes:

adding the upgrade software description information to a private field of the DSI table.

According to the second aspect or the first possible implementation manner of the second aspect, in a second possible implementation manner of the second aspect, the obtaining an upgrade data stream according to the DSI table and an upgrade software mirror corresponding to upgrade software includes:

encapsulating the upgrade software mirror by using the DSM-CC; and loading the encapsulated upgrade software mirror and the DSI table into a data segment section, to obtain the upgrade data stream, where the upgrade data stream includes at least one transport stream packet.

According to a third aspect, the present invention provides a software upgrade apparatus, where the apparatus is applied to a software upgrade of a digital television terminal and includes:

an obtaining module, configured to obtain a download server indication DSI table in an upgrade data stream according to location information of the upgrade data stream that is carried in an upgrade notification message, where the DSI table carries upgrade software description information;

a determining module, configured to trigger a display module if it is determined, according to the upgrade software description information that is obtained by the obtaining module, to upgrade local software;

the display module, configured to display the upgrade software description information and upgrade prompt information to a user; and an upgrade module, configured to: after the user determines, according to displaying of the display module, to upgrade software, obtain an upgrade software mirror in the upgrade data stream, and update the local software according to the upgrade software mirror.

In a first possible implementation manner of the third aspect, the obtaining module includes:

a transport stream packet obtaining unit, configured to obtain a transport stream packet in the upgrade data stream according to the location information of the upgrade data stream that is carried in the upgrade notification message; and a DSI table obtaining unit, configured to restore the transport stream packet that is obtained by the transport stream packet obtaining unit to obtain the DSI table that is included in a data segment section.

According to the first possible implementation manner of the third aspect, in a second possible implementation manner of the third aspect, the DSI table obtaining unit is specifically configured to:

restore the transport stream packet, to obtain the data segment section; and find the DSI table according to a table identifier table_id and a DSI information identifier message_id that are in the data segment section.

According to any one of the third aspect, or the first to the second possible implementation manners of the third aspect, in a third possible implementation manner of the third aspect, the determining module is specifically configured to:

compare the upgrade software description information with local machine version information to determine whether to upgrade the local software; and if it is determined to upgrade the local software, trigger the display module to display the upgrade software description information and the upgrade prompt information to the user.

According to any one of the third aspect, or the first to the third possible implementation manners of the third aspect, in a fourth possible implementation manner of the third aspect, the upgrade module is specifically configured to:

after the user determines, according to the displaying of the display module, to upgrade the software, obtain a download information indication DII and a download data block DBB that are in the upgrade data stream;

obtain the upgrade software mirror according to the DBB, and perform an integrity check on the upgrade software mirror; and update the local software by using the upgrade software mirror that passes the integrity check.

According to a fourth aspect, the present invention provides a software upgrade apparatus, where the apparatus is applied to a software upgrade of a digital television terminal and includes:

an information adding module, configured to add upgrade software description information to a download server indication DSI table of a digital storage media command and control DSM-CC;

an upgrade data stream obtaining module, configured to obtain an upgrade data stream according to the DSI table that is obtained by the information adding module and an upgrade software mirror corresponding to the upgrade software; and a sending module, configured to send an upgrade notification message to the digital television terminal, where the upgrade notification message carries location information of the upgrade data stream that is obtained by the upgrade data stream obtaining module, so that the digital television terminal determines, according to the upgrade notification message, whether to download the upgrade data stream so as to upgrade local software.

In a first possible implementation manner of the fourth aspect, the information adding module is specifically configured to:

add the upgrade software description information to a private field of the DSI table.

According to the fourth aspect or the first possible implementation manner of the fourth aspect, in a second possible implementation manner of the fourth aspect, the upgrade data stream obtaining module is specifically configured to:

encapsulate the upgrade software mirror by using the DSM-CC; and load the encapsulated upgrade software mirror and the DSI table into a data segment section, obtain the upgrade data stream, where the upgrade data stream includes at least one transport stream packet.

According to a fifth aspect, the present invention provides a digital television terminal, including:

a first processor, configured to: obtain a download server indication DSI table in an upgrade data stream according to location information of the upgrade data stream that is carried in an upgrade notification message, where the DSI table carries upgrade software description information; and trigger a display if it is determined, according to the upgrade software description information, to upgrade local software; and the display, configured to display the upgrade software description information obtained by the first processor and upgrade prompt information to a user; where the first processor is further configured to: after the user determines, according to displaying of the display, to upgrade software, obtain an upgrade software mirror in the upgrade data stream, and update the local software according to the upgrade software mirror.

In a first possible implementation manner of the fifth aspect, the first processor is specifically configured to:

obtain a transport stream packet in the upgrade data stream according to the location information of the upgrade data stream that is carried in the upgrade notification message; and restore the transport stream packet, obtain the DSI table that is included in a data segment section.

According to the first possible implementation manner of the fifth aspect, in a second possible implementation manner of the fifth aspect, the first processor is further configured to:

restore the transport stream packet, obtain the data segment section; and find the DSI table according to a table identifier table_id and a DSI information identifier message_id that are in the data segment section.

According to any one of the fifth aspect, or the first to the second possible implementation manners of the fifth aspect, in a third possible implementation manner of the fifth aspect, the first processor is further configured to:

compare the upgrade software description information with local machine version information to determine whether to upgrade the local software; and if it is determined to upgrade the local software, trigger the display to display the upgrade software description information and the upgrade prompt information to the user.

According to any one of the fifth aspect, or the first to the third possible implementation manners of the fifth aspect, in a fourth possible implementation manner of the fifth aspect, the first processor is further configured to:

after the user determines to upgrade the software, obtain a download information indication DII and a download data block DBB that are in the upgrade data stream;

obtain the upgrade software mirror according to the DBB, and perform an integrity check on the upgrade software mirror; and update the local software by using the upgrade software mirror that passes the integrity check.

According to a sixth aspect, the present invention passes a server, where the server includes:

a second processor, configured to: add upgrade software description information to a download server indication DSI table of a digital storage media command and control DSM-CC; and obtain an upgrade data stream according to the DSI table and an upgrade software mirror corresponding to upgrade software; and a transmitter, configured to send an upgrade notification message to a digital television terminal, where the upgrade notification message carries location information of the upgrade data stream that is obtained by the second processor, so that the digital television terminal determines, according to the upgrade notification message, whether to download the upgrade data stream so as to upgrade local software.

In a first possible implementation manner of the sixth aspect, the second processor is specifically configured to:

add the upgrade software description information to a private field of the DSI table.

According to the sixth aspect or the first possible implementation manner of the sixth aspect, in a second possible implementation manner of the sixth aspect, the second processor is further configured to:

encapsulate the upgrade software mirror by using the DSM-CC; and load the encapsulated upgrade software mirror and the DSI table into a data segment section, obtain the upgrade data stream, where the upgrade data stream includes at least one transport stream packet.

According to the present invention, upgrade software description information is added to a DSI table, so as to independently encapsulate the upgrade software description information and a program resource. Before an upgrade software mirror corresponding to the program resource is downloaded, the upgrade software description information is quickly displayed to a user, and the user determines whether to upgrade local software.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 2:
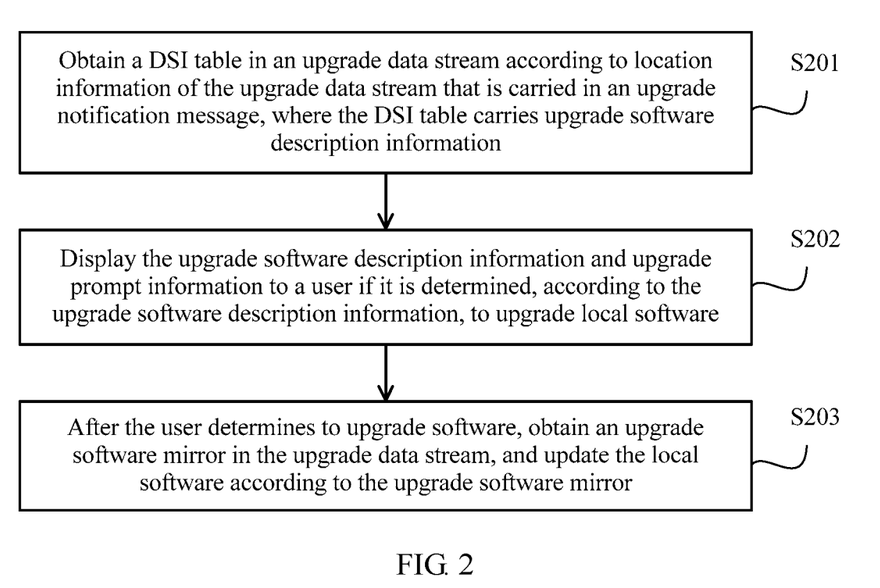
FIG. 2 is a flowchart of Embodiment 1 of a software upgrade method according to the present invention.

FIG. 2 is a flowchart of Embodiment 1 of a software upgrade method according to the present invention. This embodiment of the present invention provides a software upgrade method, which is applied to a software upgrade of a digital television terminal. The method may be executed by a software upgrade apparatus, and the apparatus may be integrated into the digital television terminal. The digital television terminal may be any terminal that complies with the Digital Video Broadcasting (Digital Video Broadcasting, DVB for short) protocol, for example, a digital television set-top box and a television set having a digital television function. As shown in FIG. 2, the method includes the following steps:

S201. Obtain a download server indication (Download_Server_Initiate, DSI for short) table in an upgrade data stream according to location information of the upgrade data stream that is carried in an upgrade notification message, where the DSI table carries upgrade software description information.

Specifically, an upgrade notification message that is carried in a program special information (Program Special Information, PSI for short) table or a service information (Service Information, SI for short) table is monitored. The upgrade notification message may be stored in a bouquet association table (Bouquet Association Table, BAT for short) or a network information table (Network Information Table, NIT for short). However, in the DVB protocol, the NIT pertains to the PSI table or the SI table, and the BAT pertains to the SI table. When the upgrade notification message is detected, the DSI table in the upgrade data stream is obtained according to the location information of the upgrade data stream that is carried in the upgrade notification message. The upgrade software description information is included in a private field of the DSI table, and the upgrade software description information may include product description information, version description information, description information of software update content, time required for upgrading software, and the like.

The foregoing location information may include a frequency parameter, a packet identifier (Packet Identifier, PID for short), and the like. A fixed frequency band is defined for information transmission in the DVB protocol. For example, a frequency band for a satellite television is 950 MHz to 2150 MHz. However, transmission of the upgrade data stream occupies only one frequency, and the frequency parameter herein is an identifier of the frequency that is occupied by the upgrade data stream. A frequency parameter in the DVB protocol may include: a frequency, a symbol rate, a polarization mode, a modulation mode, and the like.

The upgrade software description information herein may be information that includes multiple languages. That is, when upgrade software information is described, a corresponding language code may be carried, so as to present different language displays to a user.

A TS stream is formed by combining multiple types of data, and includes at least one TS packet. Data in each TS packet may be video data, audio data, padding data (for example, a caption), PSI/SI table data, or the like, and each data type corresponds to a unique PID. For example, a PID of the video data is 45, and PIDs of all video data in the TS stream are all labeled 45, which is used to distinguish from other data types.

S202. Display the upgrade software description information and upgrade prompt information to a user if it is determined, according to the upgrade software description information, to upgrade local software.

Specifically, the upgrade software description information is compared with local machine version information to determine whether to upgrade the local software. If it is determined to upgrade the local software, the upgrade software description information and the upgrade prompt information are displayed to the user; otherwise, a process ends. The upgrade prompt information is used to prompt the user that a software upgrade is to be performed. The user determines, according to the upgrade software description information, whether to upgrade the local software.

S203. After the user determines to update software, obtain an upgrade software mirror in the upgrade data stream, and update the local software according to the upgrade software mirror.

In this step, if the user determines, according to the upgrade software description information displayed in the previous step, to upgrade the local software, a remaining part of the upgrade data stream continues to be received; otherwise, an upgrade process ends, so as to reduce contention for a resource (for example, a memory or a tuner). After an entire upgrade data stream is received, a restored upgrade software mirror is used to update the local software, where the upgrade data stream includes the upgrade software mirror.

According to this embodiment of the present invention, upgrade software description information is added to a DSI table, so as to independently encapsulate software description information and a program resource. Before an upgrade software mirror corresponding to the program resource is downloaded, the upgrade software description information is quickly displayed to a user, and the user determines whether to upgrade the local software.

Figure 3:
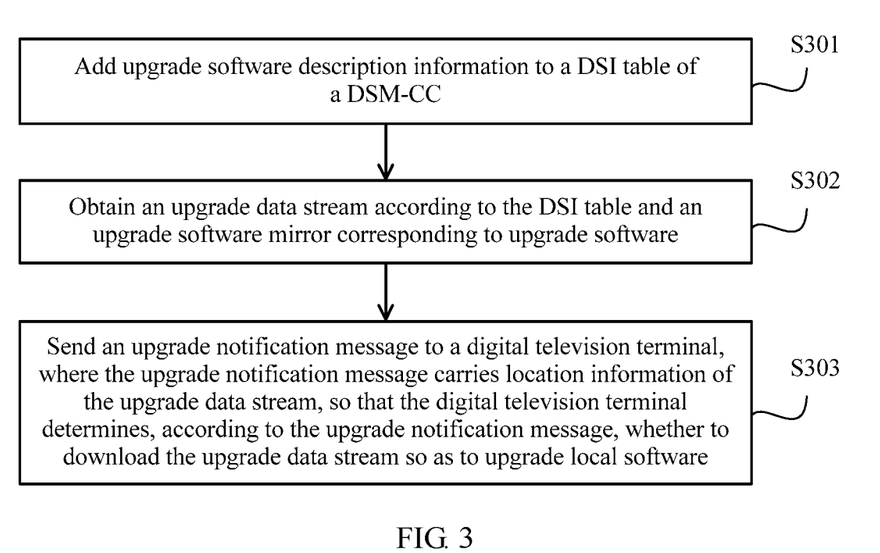
FIG. 3 is a flowchart of Embodiment 2 of a software upgrade method according to the present invention.

FIG. 3 is a flowchart of Embodiment 2 of a software upgrade method according to the present invention. This embodiment of the present invention provides a software upgrade method, which is applied to a software upgrade of a digital television terminal. The method may be executed by a software upgrade apparatus, and the apparatus may be integrated into a server. As shown in FIG. 3, the method includes the following steps:

S301. Add upgrade software description information to a DSI table of a DSM-CC.

S302. Obtain an upgrade data stream according to the DSI table and an upgrade software mirror corresponding to upgrade software.

S303. Send an upgrade notification message to a digital television terminal, where the upgrade notification message carries location information of the upgrade data stream, so that the digital television terminal determines, according to the upgrade notification message, whether to download the upgrade data stream so as to upgrade local software.

Figure 4:
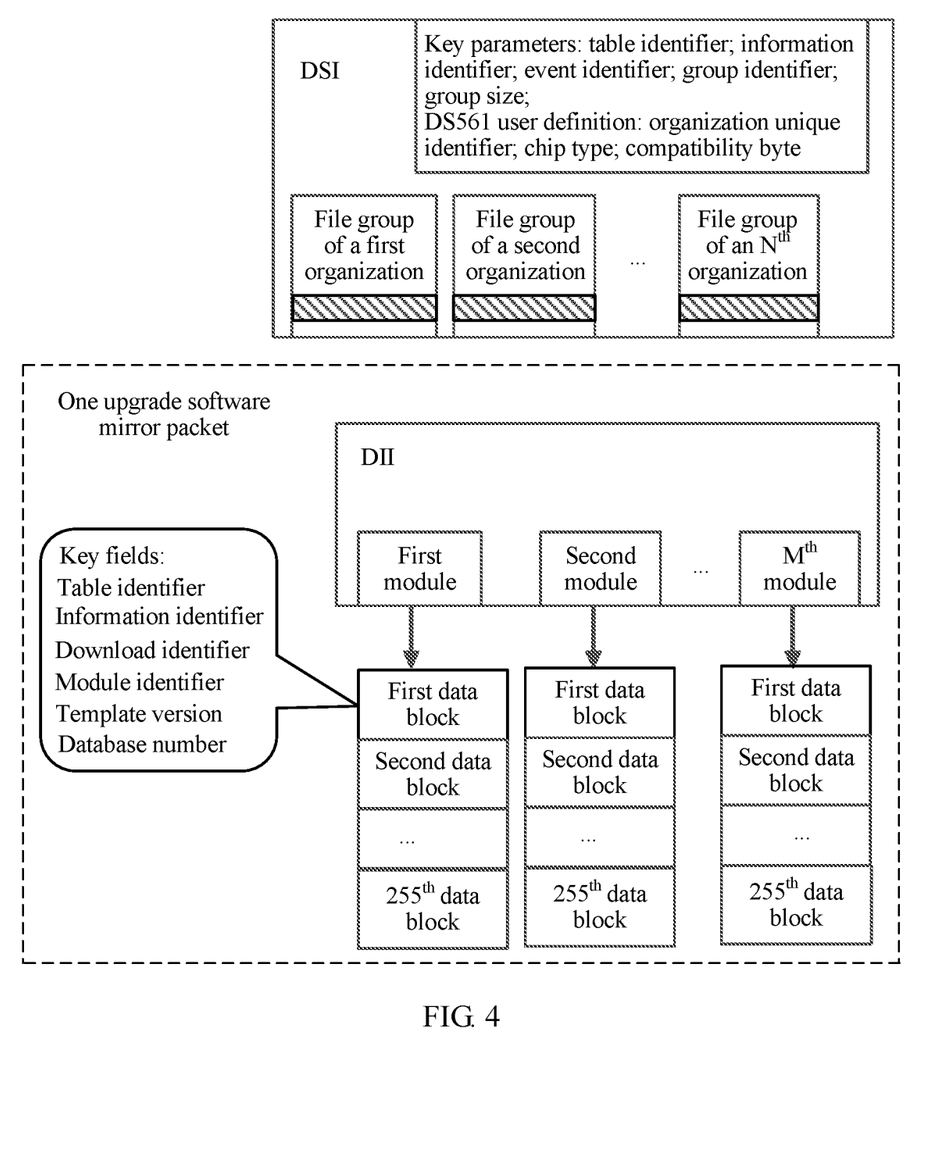
FIG. 4 is an exemplary diagram of a TS packet format in Embodiment 2 of a software upgrade method according to the present invention.

Specifically, the server triggers the software upgrade in the digital television terminal. The server adds the upgrade software description information to a private field (User_define) of the DSI table of the DSM-CC; uses the DSM-CC to encapsulate an upgrade software mirror corresponding to an upgrade program resource, divides the upgrade software mirror into one or more modules (Module), further divides each module into at least one block (Block), and encapsulates each block into one DDB, where a download information indication (Download_Info_Indication, DII for short) describes information about block division; and loads the DSI table, the DII, and the DDB into a data segment section (section) and packages the data segment section into a TS packet for transmitting, where a TS packet format and information that is included in each part are shown in FIG. 4. Correspondingly, when the digital television terminal receives the upgrade data stream (that is, one or more TS packets), the DSI table is first received and then the DII and the DDB are received. Therefore, compared with a manner of displaying upgrade software description information after receiving an entire upgrade data stream in existing implementation, the software upgrade method provided in this embodiment of the present invention may save time that is taken for a user to wait for upgrade software description information in a software upgrade process, providing better product experience for the user.

According to this embodiment of the present invention, upgrade software description information is added to a DSI table, and an upgrade software mirror is encapsulated into a DDB, so as to independently encapsulate software description information and a program resource. Before an upgrade software mirror corresponding to the program resource is downloaded, the upgrade software description information is quickly displayed to a user, and the user determines whether to upgrade local software.

Using a digital television set-top box as an example, the following describes, in a specific implementation manner, a software upgrade method provided in this embodiment of the present invention.

First, terms to be used in this embodiment are described.

A definition of a NIT in the DVB protocol is divided into two cycles: a first cycle is a description of information about an entire network; and a second cycle is a description of information about a specific frequency in the network. A Likage_descriptor of the first cycle includes location information of upgrade software, for example, an original network identifier (Original_network_ID), a transport stream network identifier (Transport_stream_ID), a service identifier (Sevice_ID), a configuration parameter of the upgrade software, and the like. The configuration parameter of the upgrade software is a parameter such as an organization unique identifier (Organization unique identifier, OUI for short), a hardware version (Hardware_version), and a software version (Software_verstion). In a network using a transport stream as a data source, values of an original network identifier and a transport stream network identifier of a NIT that is transmitted on the network are the same.

A program association table (Program Association Table, PAT for short) describes a program number (Program_Num) of an upgrade service and a PMT_PID corresponding to the program number of the upgrade service. A program map table (Program Map Table, PMT for short) describes a PID of an upgrade data stream component.

In addition, it should be noted that, in the DVB protocol, the Sevice_ID and the Program_Num are equal, and the Program_Num and the PMT_PID are in a one-to-many relationship.

Figure 5A:
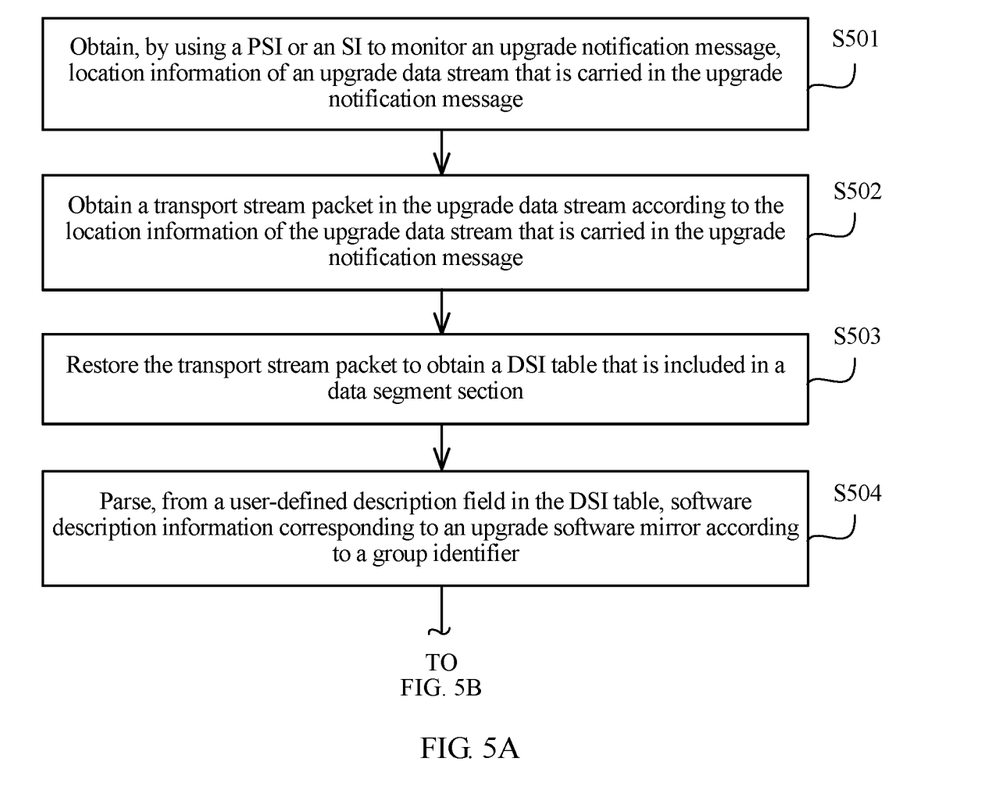
FIG. 5A and FIG. 5B are a flowchart of Embodiment 3 of a software upgrade method according to the present invention.
Figure 5B:
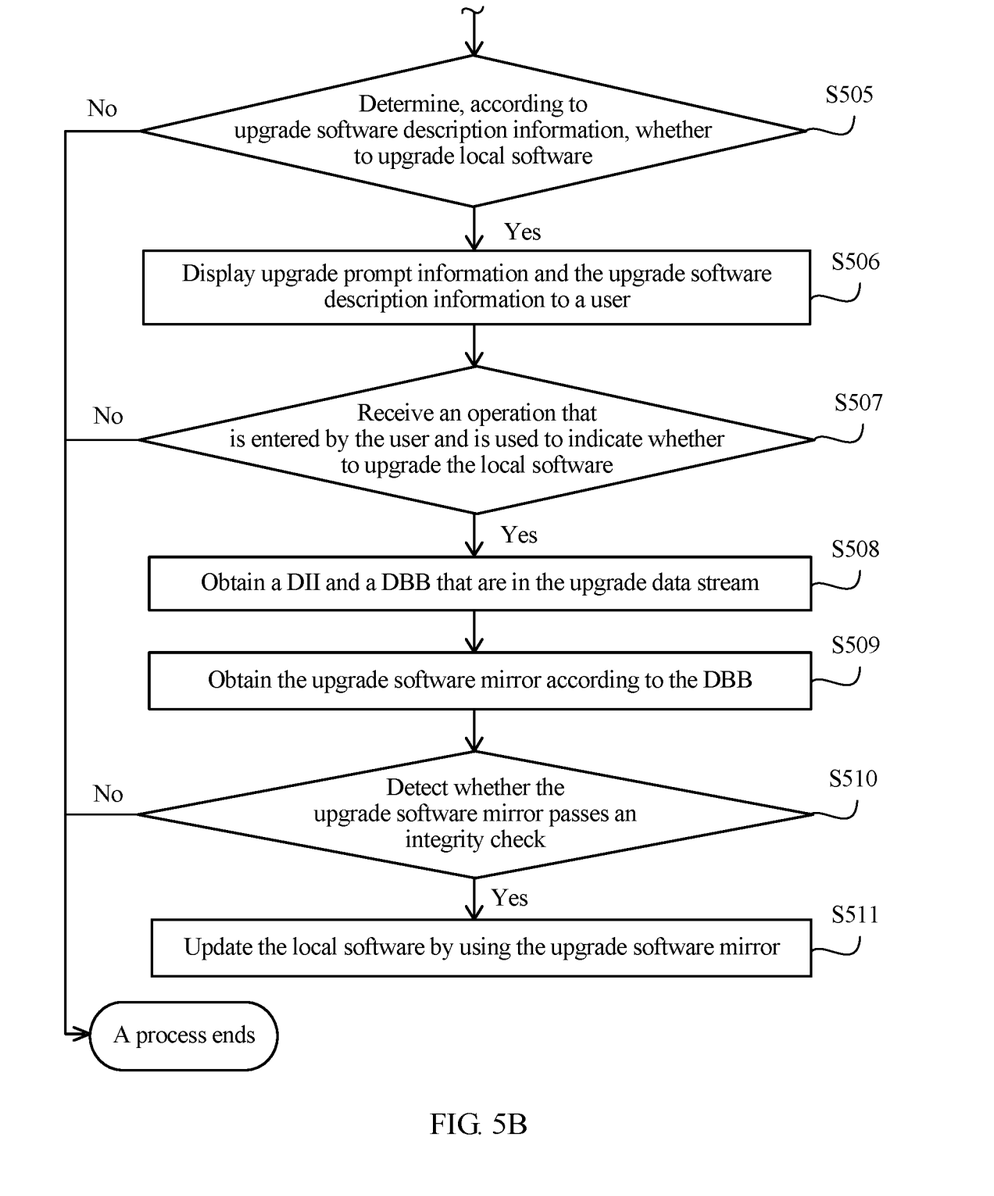

FIG. 5A and FIG. 5B are a flowchart of Embodiment 3 of a software upgrade method according to the present invention. As shown in FIG. 5A and FIG. 5B, the software upgrade method in this embodiment may include the following steps:

S501. Obtain, by using a PSI or an SI to monitor an upgrade notification message, location information of an upgrade data stream that is carried in the upgrade notification message.

This embodiment is described by using an example in which the upgrade notification message is stored in a NIT. Specifically, in S301, after detecting a Linkage_descriptor in the NIT, a set-top box obtains a configuration parameter of upgrade software; and then compares the configuration parameter of the upgrade software with a configuration parameter of local software to determine whether an upgrade is required, for example, a determining condition is to determine whether an OUI in product information corresponding to the upgrade software is consistent with the set-top box (that is, a product is unique). Other private comparison information may be further defined, for example, a product model, or a software version number is greater than a current software version number of the set-top box. If it is determined to upgrade local software, a PMT_PID corresponding to a Program_Num in a PAT is found by using location information of an upgrade data stream in the Linkage_descriptor, for example, a Sevice_ID, and then a PMT is found, and a PID of the upgrade data stream is obtained according to the PMT.

S502. Obtain a transport stream packet in the upgrade data stream according to the location information of the upgrade data stream that is carried in the upgrade notification message.

In this step, the upgrade data stream is filtered according to the PID of the upgrade data stream, to obtain the TS packet.

S503. Restore the transport stream packet, obtain a DSI table that is included in a data segment section.

Specifically, this step may include: restoring the transport stream packet to obtain the data segment section (data_section); and finding the DSI table according to a table identifier (table_id) and a DSI information identifier (message_id) that are in the data segment section. For example, a data segment loaded with the DSI table is obtained by determining a data_section of table_id=0x3B and message_id=0x1006, and the DSI table is obtained by parsing, as shown in Table 1. According to the DSI table, version information and upgrade software description information corresponding to the upgrade data stream, and the like may be obtained. Table 1 is used to describe a meaning and a value of a key field (for example, table_id and message_id) that is mentioned in any one embodiment of the present invention.

TABLE 1

| Sample of a DSI table | | | |
|---|---|---|---|
| DSMCC_section( ) { | Bit quantity | Value | Meaning |
| table_id | 8 | 0x3B | Control information |
| section_syntax_indicator | 1 | 0x01 | 1 indicates that a CRC check is used; 0 indicates that a checksum check is used. |
| private_indicator | 1 | 0x00 | |
| reserved | 2 | | |
| dsmcc_section_length | 12 | | |

TABLE 1-continued

Sample of a DSI table

| DSMCC_section( ) { | Bit quantity | Value | Meaning |
|---|---|---|---|
| table_id_extension | 16 | | Two lower bytes (bit0-bit15) of a transaction id |
| reserved | 2 | | |
| version_number | 5 | | |
| current_next_indicator | 1 | | |
| section_number | 8 | | |
| last_section_number | 8 | | |
| protocolDiscriminator | 8 | | |
| dsmccType | 8 | 0x03 | download message |
| message_id | 16 | 0x1006 | DSI message |
| transactionId-A | 32 | | Bit31-bit16 are a version number of carried data; bit15-bit0 are 0x00 or 0x01, which is changed once upon each data update. |
| reserved | 8 | | |
| adaptationLength | 8 | 0x00 | |
| messageLength | 16 | 0x1C | A length of a CRC section is not included following a message length field. |
| dmsccAdaptationHeader{ } | | | |
| serverId | 160 | 0xFF | |
| compatibilityDescriptor{ } | 16 | 0x00 | A length of compatibilityDescriptor is 0. |
| privateDataLength for(i=0;i<privateDataLength ;i++) { | 16 | 0x04 | |
| NumberOfGroups for (i= 0;i<NumberOfGroups;i++) { | 16 | | |
| GroupId | 32 | | Equal to download id |
| GroupSize | 32 | | OTA file size |
| GroupCompatibility | 16 | 0x00 | |
| GroupInfoLength for (i = 0; i < N; i++) { | 16 | 0x00 | |
| GroupInfoByte } | 8 | | |
| PrivateDataLength for(i=0;i<privateDataLength ;i++) { | 16 | | |
| OUI | 24 | 0x001882 | |
| chipset_type | 16 | 0x7231 | |
| compatibility | 8 | | 0000 0001 indicates compatibility with 561, 00000010 indicates compatibility with 365, and 00000011 indicates compatibility with both 561 and 365. |
| PrivateDataLength | 16 | | Upgrade software description information |
| For(i=0;i<privateDataLength ;i++) {Update info_byte} } } } | 8 | | |
| CRC_32 } | 32 | | |

It should be noted that, the DVB protocol stipulates that a digital television terminal identifies, by using specific values of the table_id and the message_id, different data segments in a TS packet that is encapsulated by using a DSM-CC.

S504. Parse, from a user-defined description (user_define) field in the DSI table, software description information corresponding to an upgrade software mirror according to a group identifier (Group ID).

One DSI table may include multiple groups (Group), and various groups are differentiated by Group ID.

S505. Determine, according to upgrade software description information, whether to upgrade local software.

Whether to perform an upgrade is determined by using product information and software module information that are in a private description of each group (Group) in the DSI table. The product information may be a software version number, and may further include a product model because there may be products of different models that need to be upgraded in an existing network.

If a determining result is yes, S506 is performed; otherwise, a process ends.

S506. Display upgrade prompt information and the upgrade software description information to a user.

S507. Receive an operation that is entered by the user and is used to indicate whether to upgrade the local software.

If the user chooses to upgrade the local software, S508 is performed; otherwise, the process ends.

S508. Obtain a DII and a DBB that are in the upgrade data stream.

Specifically, download data is correspondingly found by using a Group ID in the DSI table and a download identifier (download_id) in a DII table. The Group ID is equal to the download_id.

S509. Obtain the upgrade software mirror according to the DBB.

S510. Detect whether the upgrade software mirror passes an integrity check.

If the upgrade software mirror passes the integrity check, S511 is performed; otherwise, the process ends.

Because upgrade data is relatively important, some network providers require that the upgrade data be encrypted. Therefore, for an upgrade required by an advanced security condition receiving system, special signature verification needs to be performed, and for the sake of security, the signature verification is for an entire upgrade software mirror file. The advanced security condition receiving system usually cooperates with a third party vendor to encrypt the upgrade data, for example, NDS, Nagra, Conax, and the like.

S511. Update the local software by using the upgrade software mirror.

Using the software upgrade method provided in this embodiment of the present invention to upgrade local software in a digital television terminal avoids a defect in the prior art that upgrade software description information can be read only after all upgrade data is completely downloaded, so that the upgrade software description information may be quickly displayed to a user before an upgrade software mirror corresponding to a program resource is downloaded, and the user determines whether to upgrade the local software. In addition, a time for downloading all the upgrade data in the prior art is too long, and a read and write memory affects use of another service in a download process. Moreover, independent encapsulation of the upgrade software description information and the program resource in the present invention avoids redundancy in the prior art that is caused because the upgrade software description information is used as a part of the upgrade software mirror, because the upgrade software description information may be used only once.

Figure 6:
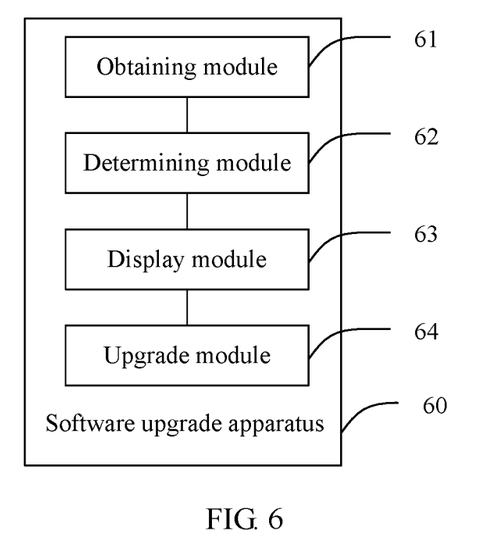
FIG. 6 is a schematic structural diagram of Embodiment 1 of a software upgrade apparatus according to the present invention.

FIG. 6 is a schematic structural diagram of Embodiment 1 of a software upgrade apparatus according to the present invention. This embodiment of the present invention provides a software upgrade apparatus, which is applied to a software upgrade of a digital television terminal. The apparatus may be integrated into the digital television terminal, where the digital television terminal may be any terminal that complies with the DVB protocol, for example, a digital television set-top box and a television set having a digital television function. As shown in FIG. 6, the software upgrade apparatus 60 includes: an obtaining module 61, a determining module 62, a display module 63, and an upgrade module 64.

The obtaining module 61 is configured to obtain a DSI table in an upgrade data stream according to location information of the upgrade data stream that is carried in an upgrade notification message, where the DSI table carries upgrade software description information; the determining module 62 is configured to trigger the display module 63 if it is determined, according to the upgrade software description information that is obtained by the obtaining module 61, to upgrade local software; the display module 63 is configured to display the upgrade software description information and upgrade prompt information to a user; and the upgrade module 64 is configured to: after the user determines, according to displaying of the display module 63, to upgrade software, obtain an upgrade software mirror in the upgrade data stream, and update the local software according to the upgrade software mirror.

The apparatus in this embodiment may be used to execute the technical solution in the method embodiment shown in FIG. 2 or FIG. 5A and FIG. 5B, and implementation principles and technical effects thereof are similar, which are not described herein.

On the basis of the foregoing embodiment, the obtaining module 61 may include: a transport stream packet obtaining unit (not shown), configured to obtain a transport stream packet in the upgrade data stream according to the location information of the upgrade data stream that is carried in the upgrade notification message; and a DSI table obtaining unit (not shown), configured to restore the transport stream packet that is obtained by the transport stream packet obtaining unit, to obtain a DSI table that is included in a data segment section.

The DSI table obtaining unit may be specifically configured to: restore the transport stream packet to obtain the data segment section; and find the DSI table according to a table_id and a message_id that are in the data segment section.

Further, the determining module 62 may be specifically configured to: compare the upgrade software description information with local machine version information to determine whether to upgrade the local software; and if yes, trigger the display module 63 to display the upgrade software description information and the upgrade prompt information to the user.

On the foregoing basis, the upgrade module 64 may be specifically configured to: after the user determines, according to the displaying of the display module 63, to upgrade the software, obtain a DII and a DBB that are in the upgrade data stream; obtain the upgrade software mirror according to the DBB, and perform an integrity check on the upgrade software mirror; and update the local software by using the upgrade software mirror that passes the integrity check.

Figure 7:
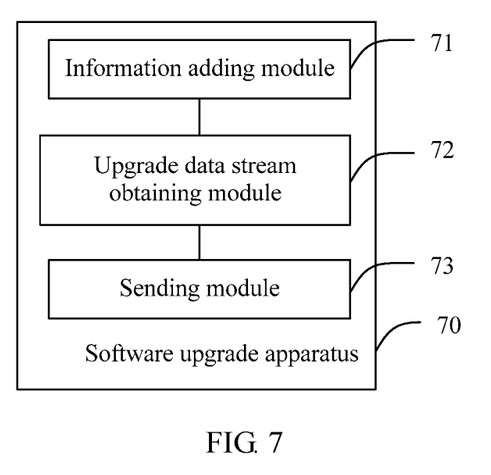
FIG. 7 is a schematic structural diagram of Embodiment 2 of a software upgrade apparatus according to the present invention.

FIG. 7 is a schematic structural diagram of Embodiment 2 of a software upgrade apparatus according to the present invention. This embodiment of the present invention provides a software upgrade apparatus, which is applied to a software upgrade of a digital television terminal. The apparatus may be integrated into a server. As shown in FIG. 7, the software upgrade apparatus 70 includes: an information adding module 71, an upgrade data stream obtaining module 72, and a sending module 73.

The information adding module 71 is configured to add upgrade software description information to a DSI table of a DSM-CC; the upgrade data stream obtaining module 72 is configured to obtain an upgrade data stream according to the DSI table that is obtained by the information adding module 71 and an upgrade software mirror corresponding to upgrade software; and the sending module 73 is configured to send an upgrade notification message to the digital television terminal, where the upgrade notification message carries location information of the upgrade data stream that is obtained by the upgrade data stream obtaining module 72, so that the digital television terminal determines, according to the upgrade notification message, whether to download the upgrade data stream so as to upgrade local software.

The apparatus in this embodiment may be used to execute the technical solution in the method embodiment shown in FIG. 3, and implementation principles and technical effects thereof are similar, which are not described herein.

In the foregoing embodiment, the information adding module 71 may be specifically configured to: add the upgrade software description information to a private field of the DSI table.

Further, the upgrade data stream obtaining module 72 may be specifically configured to: encapsulate the upgrade software mirror by using the DSM-CC; and load the encapsulated upgrade software mirror and the DSI table into a data segment section to obtain the upgrade data stream, where the upgrade data stream includes at least one transport stream packet.

Figure 8:
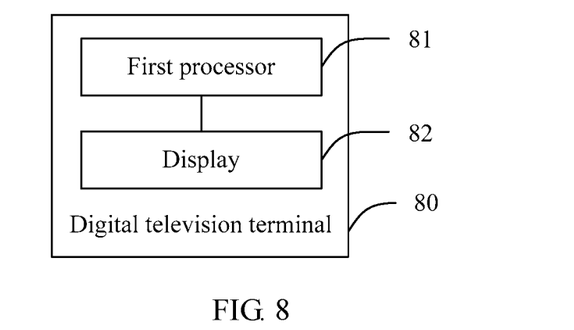
FIG. 8 is a schematic structural diagram of Embodiment 1 of a digital television terminal according to the present invention.

FIG. 8 is a schematic structural diagram of Embodiment 1 of a digital television terminal according to the present invention. This embodiment of the present invention provides a digital television terminal, and the digital television terminal may be any terminal that complies with the DVB protocol, for example, a digital television set-top box and a television set having a digital television function. As shown in FIG. 8, the digital television terminal 80 includes: a first processor 81 and a display 82.

The first processor 81 is configured to: obtain a DSI table in an upgrade data stream according to location information of the upgrade data stream that is carried in an upgrade notification message, where the DSI table carries upgrade software description information; and if it is determined, according to the upgrade software description information, to upgrade local software, trigger the display 82; the display 82 is configured to display the upgrade software description information obtained by the first processor 81 and upgrade prompt information to a user; and the first processor 81 is further configured to: after the user determines, according to displaying of the display, to update software, obtain an upgrade software mirror in the upgrade data stream, and update the local software according to the upgrade software mirror.

The digital television terminal in this embodiment may be used to execute the technical solution in the method embodiment shown in FIG. 2 or FIG. 5A and FIG. 5B, and implementation principles and technical effects thereof are similar, which are not described herein.

In the foregoing embodiment, the first processor 81 may be specifically configured to: obtain a transport stream packet in the upgrade data stream according to the location information of the upgrade data stream that is carried in the upgrade notification message; and restore the transport stream packet to obtain a DSI table that is included in a data segment section.

On the foregoing basis, the first processor 81 may be further configured to: restore the transport stream packet to obtain the data segment section; and find the DSI table according to a table_id and a message_id that are in the data segment section.

Further, the first processor 81 may be further configured to: compare the upgrade software description information with local machine version information to determine whether to upgrade the local software; and if yes, trigger the display 82 to display the upgrade software description information and the upgrade prompt information to the user.

Furthermore, the first processor 81 may be further configured to: after the user determines to upgrade the software, obtain a DII and a DBB that are in the upgrade data stream; obtain the upgrade software mirror according to the DBB, and perform an integrity check on the upgrade software mirror; and update the local software by using the upgrade software mirror that passes the integrity check.

Figure 9:
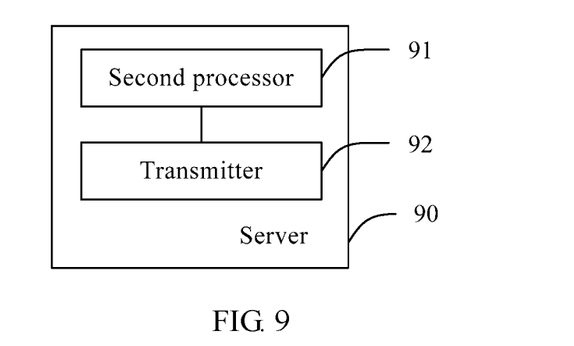
FIG. 9 is a schematic structural diagram of Embodiment 1 of a server according to the present invention.

FIG. 9 is a schematic structural diagram of Embodiment 1 of a server according to the present invention. This embodiment of the present invention provides a server, which is applied to a software upgrade of a digital television terminal. As shown in FIG. 7, the server 90 includes: a second processor 91 and a transmitter 92.

The second processor 91 is configured to: add upgrade software description information to a DSI table of a DSM-CC; and obtain an upgrade data stream according to the DSI table and an upgrade software mirror corresponding to upgrade software; and the transmitter 92 is configured to send an upgrade notification message to the digital television terminal, where the upgrade notification message carries location information of the upgrade data stream that is obtained by the second processor 91, so that the digital television terminal determines, according to the upgrade notification message, whether to download the upgrade data stream so as to upgrade local software.

The server in this embodiment may be used to execute the technical solution in the method embodiment shown in FIG. 3, and implementation principles and technical effects thereof are similar, which are not described herein.

On the foregoing basis, the second processor 91 may be specifically configured to: add the upgrade software description information to a private field of the DSI table.

Optionally, the second processor 91 may be further configured to: encapsulate the upgrade software mirror by using the DSM-CC; and load the encapsulated upgrade software mirror and the DSI table into a data segment section to obtain the upgrade data stream, where the upgrade data stream includes at least one transport stream packet.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A software upgrade method, wherein the method is applied to a software upgrade of a digital television terminal and comprises:

obtaining, by monitoring an upgrade notification message, location information of an upgrade data stream that is carried in the upgrade notification message, wherein the upgrade data stream includes independently encapsulated download server indication (DSI) table and upgrade software mirror;

obtaining, by the digital television terminal, the DSI table in the upgrade data stream according to the location information, wherein the DSI table comprises a user-defined description field, the user-defined description field carries upgrade software description information, and the upgrade software description information includes at least one of a software version number corresponding to the software upgrade or a product model corresponding to the software upgrade;

obtaining, by the digital television terminal, the upgrade software description information from the user-defined description field of the DSI table;

comparing, by the digital television terminal, the upgrade software description information carried in the user-defined description field of the DSI table with configuration information of local software to determine that the local software is to be upgraded;

in response to determining that the local software is to be upgraded according to the upgrade software description information, displaying the upgrade software description information and upgrade prompt information for a user input for updating software before downloading the upgrade software mirror carried in a remaining part of the upgrade data stream; and in response to receiving the user input for updating software, and performing the following steps:

obtaining the upgrade software mirror by continuously downloading the remaining part of the upgrade data stream; and updating the local software according to the upgrade software mirror.

2. The method according to claim 1, wherein the obtaining the DSI table in the upgrade data stream comprises:

obtaining a transport stream packet in the upgrade data stream according to the location information of the upgrade data stream that is carried in the upgrade notification message; and restoring the transport stream packet to obtain the DSI table that is comprised in a data segment section.

3. The method according to claim 2, wherein the restoring the transport stream packet to obtain the DSI table comprises:

restoring the transport stream packet to obtain the data segment section; and finding the DSI table according to a table identifier table_id and a DSI information identifier message_id that are in the data segment section.

4. The method according to claim 1, wherein the displaying the upgrade software description information and the upgrade prompt information comprises:

comparing the upgrade software description information with local machine version information to determine whether to upgrade the local software; and in response to determining that the local software is to be upgraded, displaying the upgrade software description information and the upgrade prompt information.

5. The method according to claim 1, wherein the obtaining the upgrade software mirror in the upgrade data stream comprises:

obtaining a download information indication (DII) and a download data block (DDB) that are in the upgrade data stream;

obtaining the upgrade software mirror according to the DDB; and performing an integrity check on the upgrade software mirror; and wherein the updating the local software according to the upgrade software mirror comprises: updating the local software by using the upgrade software mirror that passes the integrity check.

6. A digital television terminal, comprising: a display and a processor, configured to:

monitor an upgrade notification message and obtain location information of an upgrade data stream that is carried in the upgrade notification message, wherein the upgrade data stream includes independently encapsulated download server indication (DSI) table and upgrade software mirror;

obtain the DSI table in the upgrade data stream according to the location information, wherein the DSI table comprises a user-defined description field, the user-defined description field carries upgrade software description information, and the upgrade software description information includes at least one of a software version number corresponding to a software upgrade or a product model corresponding to the software upgrade;

obtain the upgrade software description information from the user-defined description field of the DSI table;

compare the upgrade software description information carried in the user-defined description field of the DSI table with configuration information of local software to determine that the local software is to be upgraded; and trigger the display in response to determining that the local software is to be upgraded according to the upgrade software description information; and the display communicatively coupled with the processor, wherein the display is configured to display the upgrade software description information obtained by the processor and upgrade prompt information for a user input for updating software before downloading the upgrade software mirror carried in a remaining part of the upgrade data stream; and wherein the processor is further configured to: in response to receiving the user input for updating software:

obtain the upgrade software mirror by continuously downloading the remaining part of the upgrade data stream; and update the local software according to the upgrade software mirror.

7. The digital television terminal according to claim 6, wherein the processor is configured to:

obtain a transport stream packet in the upgrade data stream according to the location information of the upgrade data stream that is carried in the upgrade notification message; and restore the transport stream packet to obtain the DSI table that is comprised in a data segment section.

8. The digital television terminal according to claim 7, wherein the processor is further configured to:

restore the transport stream packet to obtain the data segment section; and find the DSI table according to a table identifier table_id and a DSI information identifier message_id that are in the data segment section.

9. The digital television terminal according to claim 6, wherein the processor is further configured to:

compare the upgrade software description information with local machine version information to determine whether to upgrade the local software; and in response to determining that the local software is to be upgraded, trigger the display to display the upgrade software description information and the upgrade prompt information.

10. The digital television terminal according to claim 6, wherein the processor is further configured to:
in response to receiving a user input for updating software:
obtain a download information indication (DII) and a download data block (DDB) that are in the upgrade data stream;
obtain the upgrade software mirror according to the DDB, and perform an integrity check on the upgrade software mirror; and
update the local software by using the upgrade software mirror that passes the integrity check.

* * * * *